United States Patent
Rautila (10) Patent No.: US 6,714,797 B1
(45) Date of Patent: Mar. 30, 2004

(54) SYSTEM AND METHOD FOR THE TRANSFER OF DIGITAL DATA TO A MOBILE DEVICE

(75) Inventor: Heikki Rautila, Espoo (FI)

(73) Assignee: Nokia Corporation, Tampere (FI)

( * ) Notice: Subject to any disclaimer, the term of this patent is extended or adjusted under 35 U.S.C. 154(b) by 0 days.

(21) Appl. No.: 09/572,905

(22) Filed: May 17, 2000

(51) Int. Cl.⁷ .................................................. H04M 1/00
(52) U.S. Cl. .................. 455/552.1; 455/41.2; 455/66.1; 455/422.1; 455/425; 455/550.1; 455/553.1; 455/554.2; 345/901; 705/26; 705/27
(58) Field of Search .................................. 455/434, 463, 455/555, 556, 569, 574, 575, 517, 552.1, 553.1, 554.2, 41.2, 41.3, 550.1, 425, 422.1, 66.1; 345/901; 705/26, 27

(56) References Cited

U.S. PATENT DOCUMENTS

| | | | | |
|---|---|---|---|---|
| 3,996,554 A | * | 12/1976 | Ives et al. | 340/901 |
| 4,992,940 A | * | 2/1991 | Dworkin | 705/26 |
| 5,121,126 A | * | 6/1992 | Clagett | 342/419 |
| 5,796,351 A | | 8/1998 | Yabuki | |
| 5,983,073 A | * | 11/1999 | Ditzik | 455/11.1 |
| 6,181,284 B1 | * | 1/2001 | Madsen et al. | 343/702 |
| 6,219,696 B1 | * | 4/2001 | Wynblatt et al. | 709/218 |
| 6,255,800 B1 | * | 7/2001 | Bork | 320/115 |
| 6,330,244 B1 | * | 12/2001 | Swartz et al. | 370/401 |
| 6,335,678 B1 | * | 1/2002 | Heutschi | 340/286.02 |
| 6,347,398 B1 | * | 2/2002 | Parthasarathy et al. | 717/178 |
| 6,430,395 B2 | * | 8/2002 | Arazi et al. | 455/41 |
| 6,434,403 B1 | * | 8/2002 | Ausems et al. | 455/556 |

FOREIGN PATENT DOCUMENTS

| | | |
|---|---|---|
| EP | 0853287 | 7/1998 |
| WO | 9907125 | 2/1999 |
| WO | 9948312 | 9/1999 |
| WO | 0101711 | 1/2001 |

OTHER PUBLICATIONS

Bluetooth Protocol Architecture, Version 1.0, pp. 2–20, Sep. 29, 1999.

The Official Bluetooth SIG Website, http://www.bluetooth.com/, Mar. 22, 2000.

* cited by examiner

Primary Examiner—William Trost
Assistant Examiner—James D Ewart
(74) Attorney, Agent, or Firm—Antonelli, Terry, Stout & Kraus, LLP

(57) ABSTRACT

A system, method and computer program for ordering, paying for and download digital products to a mobile device in a cost-effective manner. The mobile device includes a short range transceiver and a network transceiver. The mobile device accesses electronic shop server web sites which contain digital products for sale and hotspot network locations where these digital products may be downloaded to the mobile device via the short range transceiver. The hotspot network locations contain a hotspot device for transmitting the digital products to the mobile devices via the low power radio frequency signal of the short range transceivers when the mobile device has detected the low power radio frequency signal. Using this system, method and computer program, a user of a mobile device may download large amounts of digital data without incurring telephone or cellular phone charges.

33 Claims, 7 Drawing Sheets

SYSTEM AND METHOD FOR THE TRANSFER OF DIGITAL DATA TO A MOBILE DEVICE

FIELD OF THE INVENTION

The invention relates to a system and method for the transfer of digital data to a mobile device. More particularly, the invention is a system and method in which digital products may be ordered using an Internet capable cellular phone and downloaded to the cellular phone in a cost-effective manner.

BACKGROUND OF THE INVENTION

With the explosion in Internet access and usage an increasing volume of business is occurring involving the purchase and receipt of digital products. Currently, a typical Internet user would have a browser installed in his local computer or server such as Internet Explorer™ or Netscape™. Using this browser, the user would access an Internet service provider, such as America-On-Line (AOL™), via a modem over the local public switched telephone network (PSTN). Once logged onto the Internet server, the user may utilize one of the many search engines, such as Yahoo™ or Lyco™, to specify search terms. The user may also use a web crawler, spider or robot to attempt to find a product, service or information desired. The search engine or web crawler would then respond with a list of web sites which matched the search terms the user provided. The user would then log onto a web site and view the products or services available for sale. If the user decides to buy the item from the web site, the firm operating the web site would frequently request a credit card number be entered by the user in order to pay for the product or service. Once the credit card charge is approved, the operator of the web site will then typically ship the item to the user. In the case where the item ordered is digital in format, such as software, graphics, text, video, or music, the item ordered maybe downloaded into the user's PC, server, lap top, palm computer or other processor-based system.

With the advent of cellular phones, with and without wireless access protocol (WAP), a user may also "surf" the Internet and order goods and services directly through the WAP-capable phone or a processor-based system connected to the cellular phone in a similar manner as that used with a PC. Thus, a user may order goods and services from anywhere a cellular phone, satellite phone, or other type of mobile phone may operate. Therefore, a person could be sitting in the middle of a remote area, many miles away from another human being, let alone a telephone line, and order a video game from a web site on the other side of the planet and download it into his palm computer connected to a cellular or a standalone WAP or HTML (Hypertext Markup Language) capable phone and play the game on the spot.

However, there is a significant drawback to the use of a cellular phone to transfer a large amount of data and that is the amount of time it takes to transfer that data. It takes a very long time to transfer a large file of digital information using a cellular phone. This stems from the fact that the transfer rate for a cellular phone is relatively slow. Therefore, it would take a great deal of time to download a video, audio, text or software file using a cellular phone. This is generally not practical considering the high per minute cost of many calling plans most cellular users have contracted for. In some cases, the cellular charge for downloading a large digital file, such as a movie, would exceed the cost of the product itself. Thus, for all practical purposes, there exists no cost effective system or method for downloading a large digital product over a mobile device such as a cellular phone.

A new communications device has been proposed using what is called a Bluetooth protocol architecture which allows for high transfer rates of digital data over relatively short distances. This architecture is described in a white paper by Riku Mettala entitled "Bluetooth Protocol Architecture Version 1.0", dated Aug. 25, 1999, copyright Nokia Mobile Phones 1999, and is incorporated herein by reference in its entirety. This Bluetooth protocol architecture telephone includes both a cellular telephone and a low-power radio frequency (LPRF) receiver and transmitter. This Bluetooth protocol architecture telephone may act as three phones in one. Using its LPRF transmitter and receiver along with a base station connected to the public switched telephone network (PSTN), the Bluetooth protocol architecture telephone may function as a cordless telephone. Further, using its LPRF capability the Bluetooth protocol architecture telephone may communicate directly to other Bluetooth protocol architecture telephones that are within range and function as a "walkie-talkie" without incurring any charge. In addition, the Bluetooth protocol architecture telephone may operate as a cellular telephone.

The LPRF receiver and transmitter operates at a frequency band of 2.4 Ghz having an optimal range of within 10 meters to a maximum range of 100 meters. A gross data transfer rate of one million bits per second (Mbps) may be achieved using the LPRF capability of Bluetooth protocol architecture telephone. Therefore, the Bluetooth protocol architecture telephone may achieve high data transfer rates but only at short distances. Thus, the ability to transfer data at high rates using the Bluetooth architecture telephone phone is limited to under 100 meters of a bluetooth device. Further, when used in conjunction with a base station connected to a PSTN, a Bluetooth protocol architecture telephone is restricted by the speed of modem connecting the base station to the PSTN. Thus, no effective system and method is known for a mobile communications device to quickly download a large amount digital data in a cost-effective manner.

Therefore, what is needed are a system and method whereby large quantities of digital data can be quickly and inexpensively transferred to a mobile communications device. This system and method should be user-friendly, thereby further adding to Internet sales and business activity. This system and method should also support a business model that encourages both consumers and suppliers to use the system and method through availability of enhanced low-cost services to the consumer and enhanced sales to the supplier and retailer.

SUMMARY OF THE INVENTION

An embodiment of the present invention provides a method of ordering and downloading digital products into a mobile device. This method starts by accessing an electronic shop server and ordering a digital product from the electronic shop server using the mobile device which has cellular phone capability. The method then identifies a hotspot network location where the digital product may be downloaded into the mobile device using a short range transceiver embedded in the mobile device. Thereafter, the mobile device detects a low power radio frequency signal generated by the hotspot network location. The digital product is then downloaded into the mobile device by the hotspot network location transmitting the digital product using the low power radio frequency signal to the short range transceiver of the mobile device.

Further, an embodiment of the present invention is a method of ordering and downloading digital products into a mobile device. This method detects by using the mobile device the presence of a low power radio frequency signal generated by a hotspot network location. The method then selects from several digital products available for sale at the hotspot network location a digital product for purchase using the mobile device. The method then downloads the digital product into the mobile device using the low power radio frequency.

Still further, an embodiment of the present invention provides for a system for ordering and downloading digital products into a mobile device. This system has a hotspot network for transmitting a low power radio frequency signal having a digital product encoded in the low power radio frequency signal. This system further has a mobile device having a short range transceiver for receiving the digital product encoded in the low power radio frequency signal and a memory for storing the digital product.

In addition, an embodiment of the present invention provides for a computer program executable by a computer and embedded on a computer readable medium for ordering and downloading digital products into a mobile device. This computer program uses a hotspot network code segment for transmitting a digital product encoded in a low power radio frequency signal. The computer program also has a mobile device code segment for receiving the digital product encoded in the low power radio frequency signal and storing the digital product in a memory.

These and other features of this device and method will become more apparent from the following description when taken in connection with the accompanying drawings which show, for purposes of illustration only, examples in accordance with the present invention.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be understood that the same is by way of illustration and example only and the invention is not limited thereto. The spirit and scope of the present invention are limited only by the terms of the appended claims.

The following represents brief descriptions of the drawings, wherein.

DETAILED DESCRIPTION

Before beginning a detailed description of the subject invention, mention of the following is in order. When appropriate, like reference numerals and characters maybe used to designate identical, corresponding or similar components in differing figure drawings. Further, in the detailed description to follow, exemplary sizes/models/values/ranges may be given, although the present invention is not limited to the same.

Figure 1:
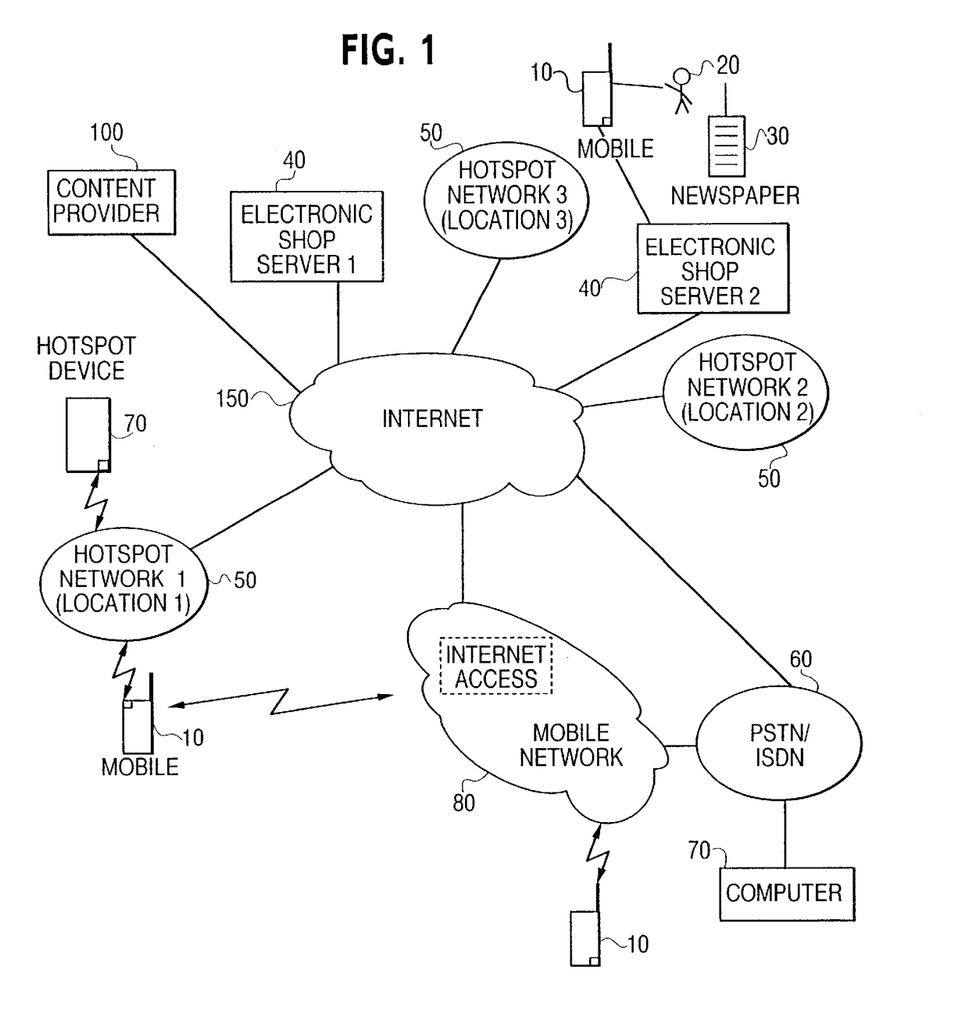
FIG. 1 is an example of an overall system diagram of an embodiment of the present invention.

FIG. 1 illustrates an example of an overall system diagram of an embodiment of the present invention. In this example, a mobile station or terminal 10 acts as an interface for the user or consumer 20 for access to the present invention. This mobile station 10 may be a WAP-capable cellular telephone, a Hypertext Markup Language (HTML) capable cellular telephone, or a cellular telephone with a processor-based system connected to it. The mobile station 10 further contains a short range transceiver 210 which will be discussed in further detail in reference to FIG. 2. This processor-based system may be, but not limited to, a laptop computer, palm computer, or other portable computing devices including the WAP-capable or HTML-capable telephone alone. The mobile station (MS) 10 may communicate through the mobile network 80 to the Internet 150 and then to an electronic shop server 40. The mobile station 10 may also communicate directly to the electronic shop server 40 through the public switched telephone network/integrated services digital network (PSTN/ISDN) 60. The electronic shop server 40 may be discovered by user 20 through, but not limited to, such advertisements as may be found in a newspaper 30, magazine, journal or any other form of advertisement such as, radio or television advertisement. Further, as previously discussed, the user 20 may discover the existence of the electronic shop server 40 on the Internet 150 through the use of a search engine or web crawler using computer 70 or mobile station 10.

The electronic shop server 40 provides a menu of digital products supplied from content providers 100 available for purchase by user 20. The user 20 may directly download the digital products from the electronic shop server 40 using the cellular phone capabilities of the mobile station 10. The user may also proceed to a hotspot network 50 to download the digital product using the LPRF capability of the mobile station 10. Each hotspot network 50 would have at least one hotspot device 90 to transmit the digital products to the mobile station 10. The hotspot device 90 has the capability of detecting distance between hotspot device 90 and mobile station 10 and adjusting its power output for the LPRF signal so as to use minimum power. The selection of whether to download a digital product directly from the electronic shop server 40 or proceed to the hotspot network 50 is made by the user 20 based on the estimated time it would take for the digital product to be downloaded using the cellular phone capabilities of the mobile station 10 versus traveling to a hotspot network 50 location. Thus, the user 20 can effectively perform a cost benefit analysis of downloading to the cellular phone in the mobile station 10 versus traveling to a hotspot 50 and downloading the digital product through the much faster short range transceiver 210, shown in FIG. 2.

Figure 2:
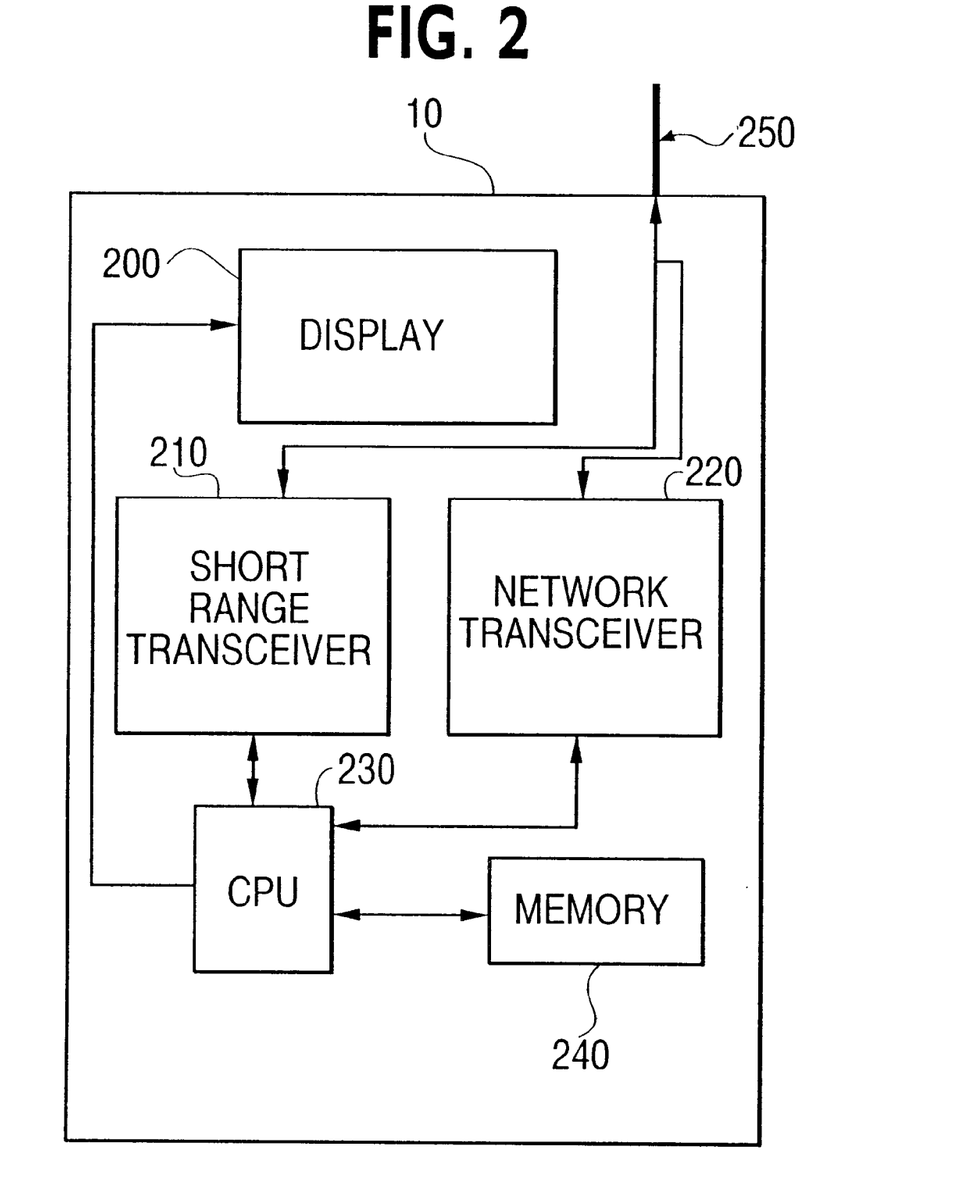
FIG. 2 is a diagram of the mobile station used by the embodiments of the present invention.

The hotspot network 50 location may be, but not limited to, a shopping mall, department store, franchise store, or video store. Further, the hotspot network 50 location is not limited to retail establishments but may be any place where potential consumers congregate. This would include such places as restaurants, airports, train stations, and stadiums. The only limitation that may exist for establishing a hotspot network 50 location is the ability to install a hotspot device 90 which can generate an LPRF signal that can be received by mobile station 10. Therefore, any area both indoors and outdoors may be used in which a hotspot device 90 can be installed FIG. 2 is a diagram of the mobile station 10 used by the embodiments of the present invention. Mobile station 10 uses an antenna 250 to receive both LPRF signals and cellular phone signals. The cellular phone signals are transmitted by the antenna 250 to network transceiver 220 and thereafter to a central processing unit (CPU) 230 for storage in memory 240 or for presentation on display 200. The LPRF signals are also received by antenna 250 and transmitted to short range transceiver 210. Again, the data received by short range transceiver 210 is sent to CPU 230 for storage in memory 240 or presentation on display 200. The LPRF signals are transmitted by hotspot device 90 contained within the hotspot network 50 location, shown in FIG. 1.

A discussion will now be supplied involving the logic employed in the embodiments of the present invention. Specifically, a discussion will be provided of the modular configuration diagram provided in FIG. 3 and the flowcharts illustrated in FIGS. 4 through 7. The flowcharts shown in FIGS. 4 through 7, as well as the modular configuration diagram shown in FIG. 3, contain operations that correspond, for example, to code, sections of code, instructions, firmware, hardware, commands or the like, of a computer program that is embodied, for example, on a storage medium such as floppy disk, CD Rom, EP Rom, hard disk, etc. Further, the computer program can be written in any language such as, but not limited to, for example C++. In the discussion of the flowcharts found in FIGS. 4 through 7, reference will be simultaneously made to the modular configuration diagram illustrated in FIG. 3.

Figure 3:
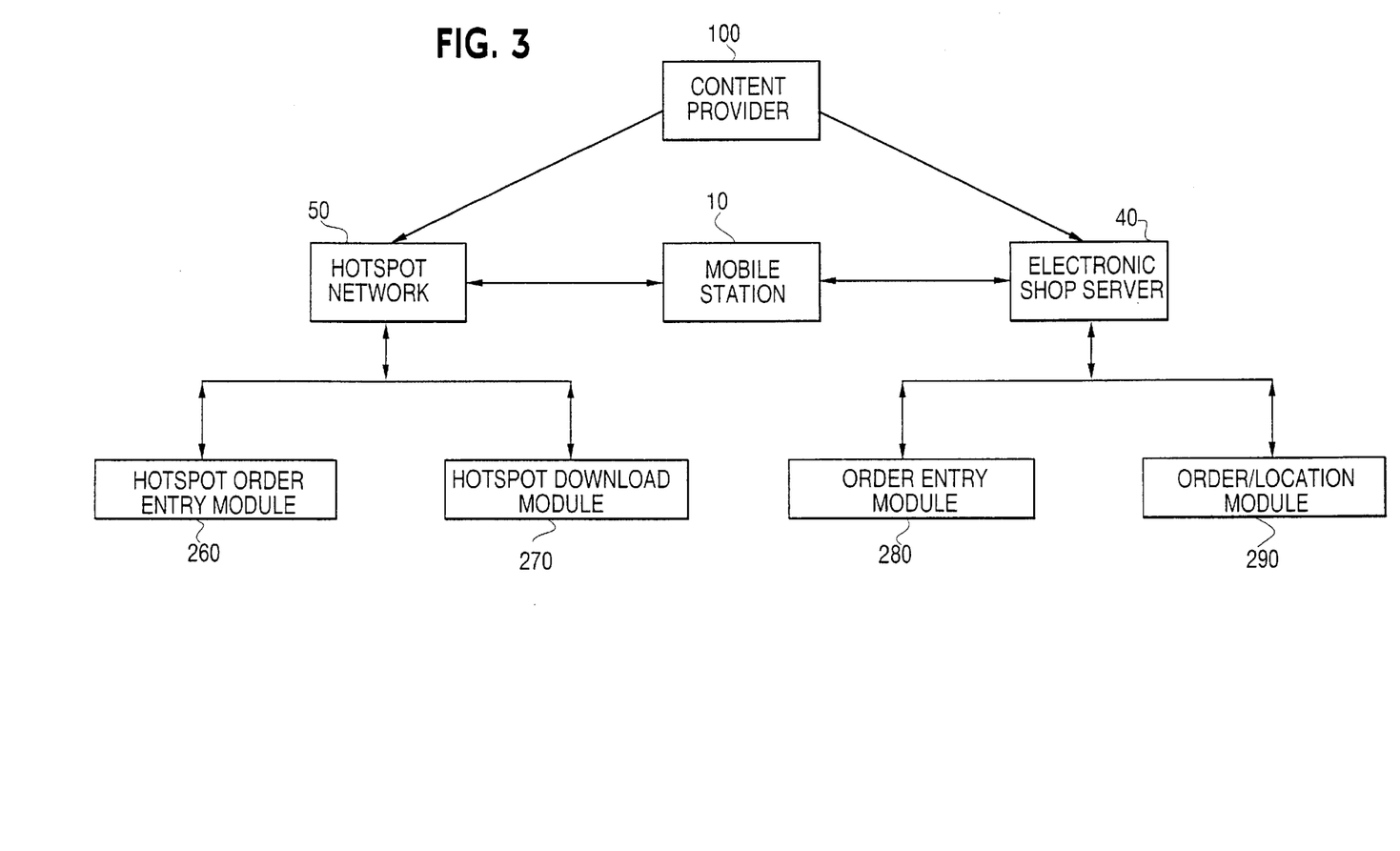
FIG. 3 is a modular configuration diagram showing the data flow used by the embodiments present invention.

FIG. 3 is a modular configuration diagram showing the data flow used by the embodiments present invention. As indicated in FIG. 3, the mobile station 10 communicates to hotspot network 50 and electronic shop server 40. As previously discussed above, the user 20 employing the mobile station 10 would typically contact the electronic shop server 40 and proceed to location of hotspot network 50 location to receive the digital product. However, as discussed ahead in further detail, user 20 may make further searches and purchases of digital products while located at hotspot network 50 location. In turn, both hotspot network 50 and electronic shop server 40 are connected to one or more content providers 100 and receive the digital product which would be ultimately sold to user 20 and downloaded into mobile station 10. Further, hotspot network 50 may employ a hotspot order entry module 260 and a hotspot download module 270 to take orders and download digital products. In addition, an electronic shop server 40 may use an order entry module 280 and an order/location module 290 to take orders, download digital product, and direct a user 20 to a hotspot network 50 location where the digital product may be downloaded.

Figure 4:
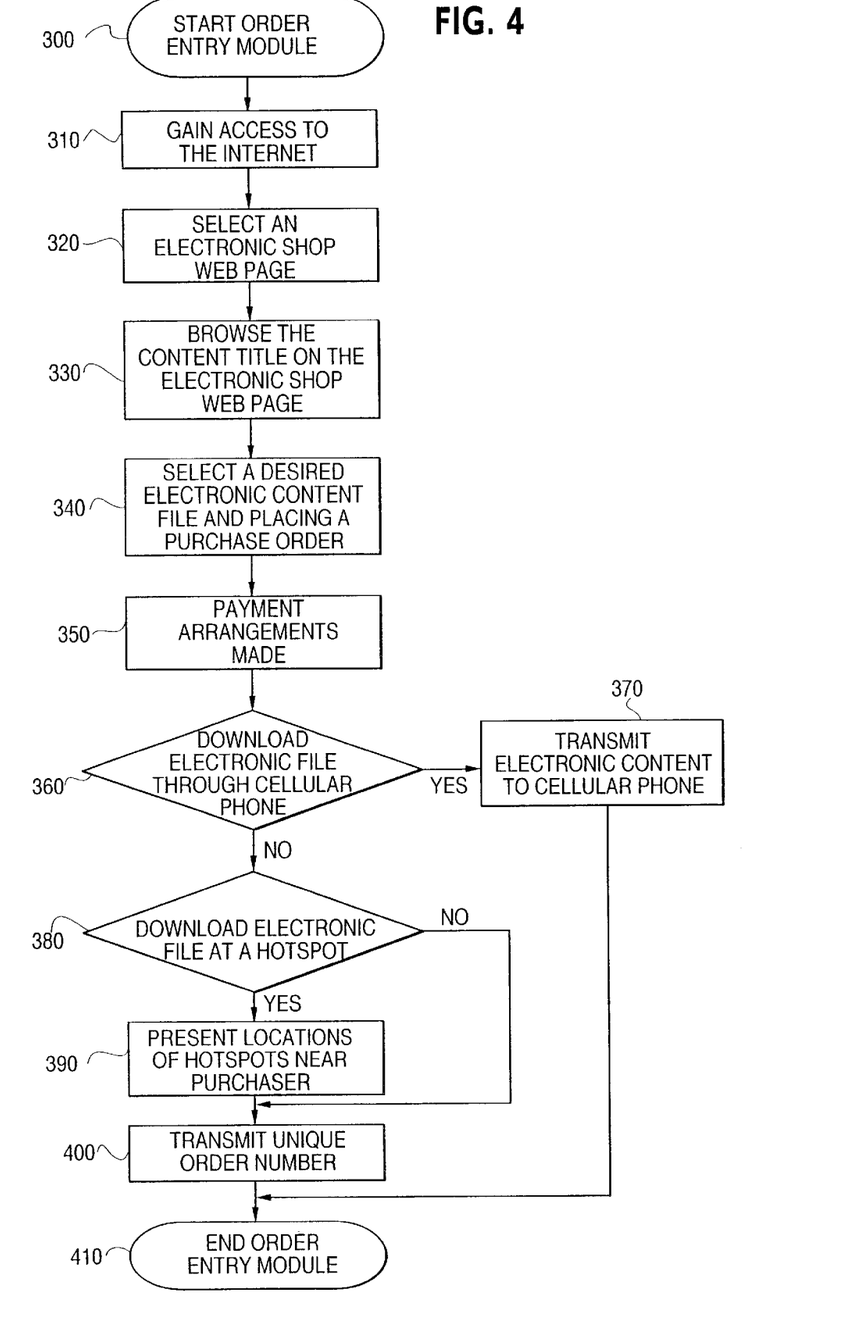
FIG. 4 is a flowchart of an order entry module, shown in FIG. 3, used by an embodiment of the present invention.

FIG. 4 is a flowchart of an order entry module 280, shown in FIG. 3, used by an embodiment of the present invention. Order entry module 280 begins execution in operation 300 and terminates in operation 410, as shown in FIG. 4. Upon start-up, in operation 300, the order entry module 280 immediately proceeds to operation 310. In operation 310, the user 20, via mobile station 10, gains access to the Internet 150 and selects an electronic shop server 40 to logon to. Thereafter, in operation 330, user 20 may browse the content titles available on the electronic shop server 40 which would be shown on display 200 of mobile station 10. The user then may select, via mobile station 10, a particular digital product desired and place a purchase order with the electronic shop server 40 in operation 340. Thereafter, in operation 350, payment arrangements are made with electronic shop server 40. Such payment arrangements may include immediate payment via a credit card or charging the price of the digital product to the user's 20 cellular phone account. Further, payment arrangements may include payment only upon receipt of the content product. Thereafter, in operation 360 the user 20 is requested to select whether he desires to download the digital product via the cellular phone capability of mobile station 10. At this time the user may be provided with an estimated time to download via the cellular phone and the approximate cost. Should the user 20 decide to download digital product via the cellular phone capability of mobile station 10, processing proceeds operation 370 where the digital product is downloaded through the cellular phone capability of the mobile station 10. Thereafter, processing proceeds to operation 410 where execution of the order entry module 280 terminates.

However, should the user 20 elect not to download digital product via the cellular phone capability of the mobile station 10, processing proceeds to operation 380. In operation 380, a determination is made whether the user 20 desires to download the digital product at hotspot network 50 location. If, in operation 380, the user 20 decides to download the digital product at a hotspot network 50, processing proceeds through operation 390 where a list of the local hotspot network 50 locations is presented to the user 20. Thereafter, whether the user 20 decides to have the electronic product downloaded at a hotspot network 50 location or via the cellular phone capability of the mobile station 10, a unique order number is transmitted to mobile station 10 by the electronic shop server 40 in operation 400. Thereafter, in operation 410 processing terminates for the order entry module 280.

Figure 5:
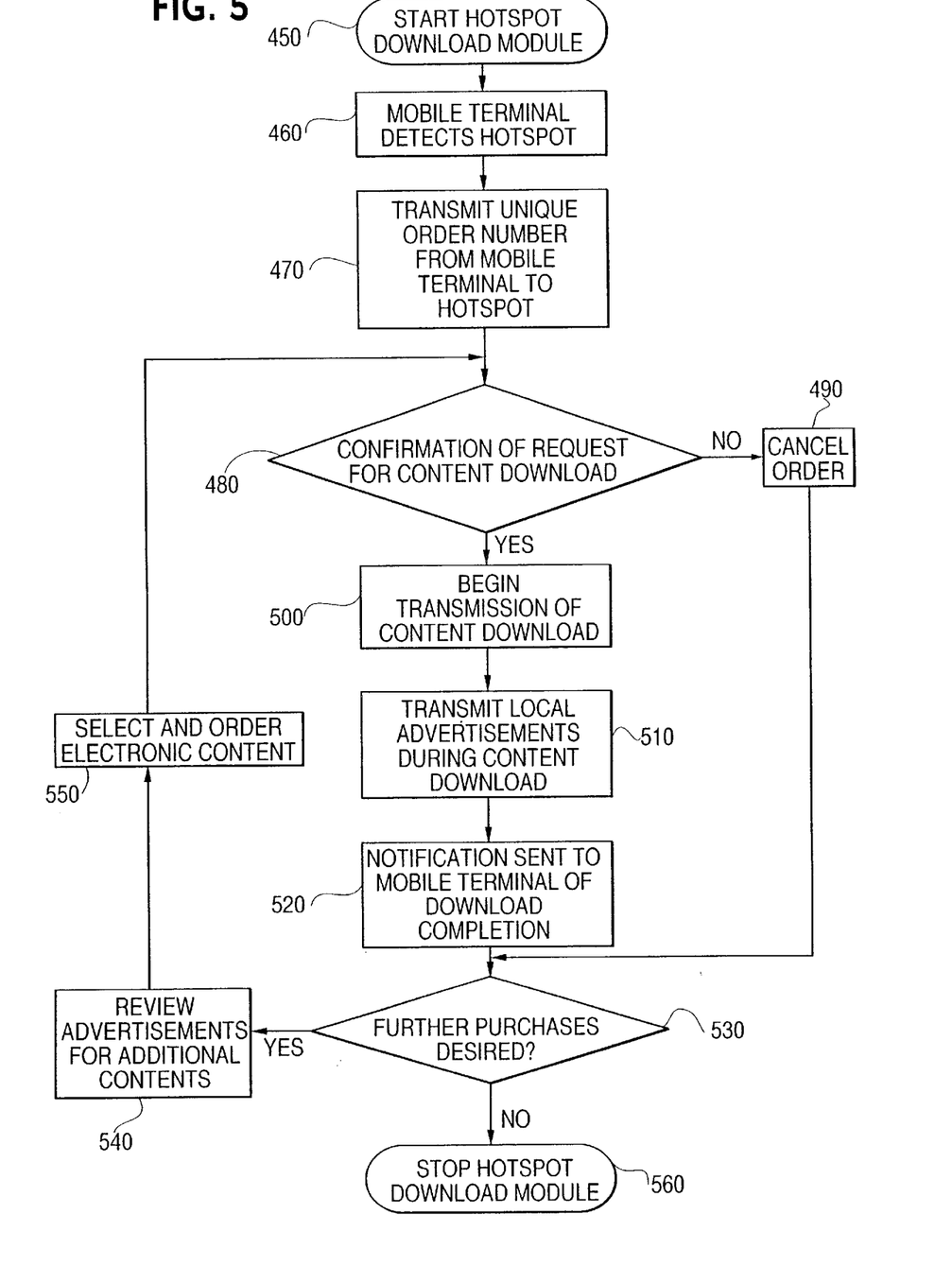
FIG. 5 is a flowchart of a hotspot download module, shown in FIG. 3, used by the embodiments of the present invention.

FIG. 5 is a flowchart of a hotspot download module, shown in FIG. 3, used by the embodiments of the present invention. The hotspot download module 270 includes operations 450 through 560 shown in FIG. 5. The hotspot download module 270 begins execution in operation 450 and immediately proceeds to operation 460. In operation 460, mobile station 10 automatically detects that it has entered a hotspot network 50 location through the receipt of an LPRF signal transmitted by hotspot device 90, shown in FIG. 1. Thereafter, in operation 470 the mobile station 10 transmits the unique order number received from the electronic shop server 40 via order entry module 280 to the hotspot device 90. Processing in the hotspot download module 270 then proceeds to operation 480 where the hotspot network 50 transmits a request for confirmation of the digital product download from the user 20 via mobile station 10. If it is determined in operation 480 that the user 20 no longer desires to purchase the digital product, then processing proceeds to operation 490 where the order is canceled. However, if user 20 confirms the request to download the digital product at this time, then processing proceeds to operation 500 where the hotspot network 50 begins transmission of the digital product via hotspot device 90. Processing proceeds to operation 510 where during the transmission of the digital product the hotspot network 50 may also transmit advertisements to be shown on display 200 of mobile station 10. Since, the time to transmit varies according to the size of the digital product, the amount of advertising may vary from a few seconds to several minutes. Thereafter, in operation 520, notification is sent to the mobile station 10 indicating completion of the download process. In operation 530, whether the download has completed in operation 520 or the order is canceled in operation 490, the user 20 is queried to determine if further purchases are desired. If further purchases are desired processing proceeds to operation 540 where user 20 is presented with a menu of digital products available at the hotspot network 50 location. This menu of digital products may be generated by the hotspot network 50 server and is restricted to only digital products available within the hotspot network 50 location itself. Thereafter, processing proceeds to operation 550, where the user 20 selects and orders another digital product. Processing then loops back to operation 480 where the process of confirmation and downloading is repeated. If however it is determined in operation 530 that no further purchases are desired, then processing proceeds to operation 560 where the hotspot download module 270 terminates execution.

Figure 6:
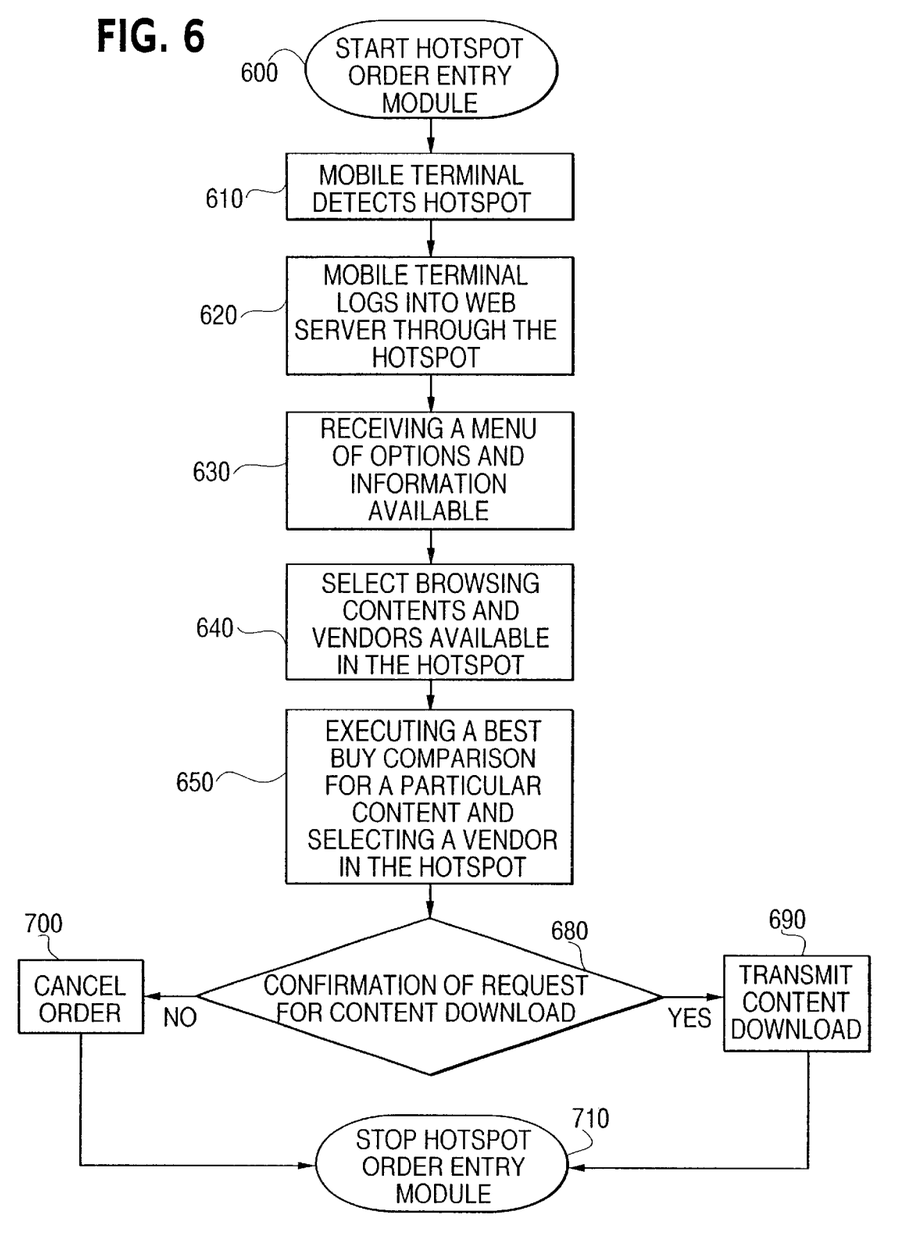
FIG. 6 is a flowchart of a hotspot order entry module, shown in FIG. 3, used by the embodiments of the present invention.

FIG. 6 is a flowchart of a hotspot order entry module 260, shown in FIG. 3, used by the embodiments of the present invention. The hotspot order entry module 260 includes operations 600 through 710 shown in FIG. 6. The hotspot order entry module 260 begins execution in operation 600 and immediately proceeds to operations 610. The mobile station 10 detects an LPRF signal broadcast by the hotspot device 90 upon entering a hotspot network 50 location. Thereafter, the mobile station 10 accesses a server located within the hotspot network 50 location or the electronic shop server 40 via the hotspot network 50. In either case, processing proceeds to operation 630 where the mobile station 10 receives a menu of options and information available at the hotspot network 50 location. In operation 640 the user 20, through the mobile station 10, may select browsing the digital products and vendors available at the hotspot network 50 location. Thereafter, in operation 650, the user 20 may execute a best buy comparison function for a particular digital product that the user 20 desires to purchase. Such a best buy comparison would list the vendors within the hotspot network 50 location that offer the digital product starting from the least expensive to the most expensive. In the case where vendors offer the same digital product at the same price, the vendor offering the highest commission to the hotspot network 50 location may be listed first. Of course, as would be appreciated by one of ordinary skill in the art any method may be negotiated between a shopping mall operator and the real establishments regarding payment for services provided by the mall operator and how to determine listings when to vendors offer the same product at the same price. The user 20 may then select a vendor within the hotspot network 50 location and order the digital product. The user 20 may then proceed to the vendor's location within the hotspot network 50 location and upon entering the vendor's establishment, the mobile station 10 would detect an LPRF signal from the vendor's hotspot device 90 and establish communications with the vendor's hotspot device 90. In this manner, each vendor in a shopping mall or other facility may operate its own hotspot network 50 within the hotspot network 50 location of the shopping mall or other facility. Thereafter, the vendor's hotspot device 90 would request confirmation of the order in operation 680. If the order is confirmed in operation 680, the vendor's hotspot device 90 would download the digital product to the mobile station 10 in operation 690. However, if confirmation is not received in operation 680, processing proceeds to operations 700 where the order is canceled. In either case, the hotspot order entry module 260 terminates processing in operation 710.

Figure 7:
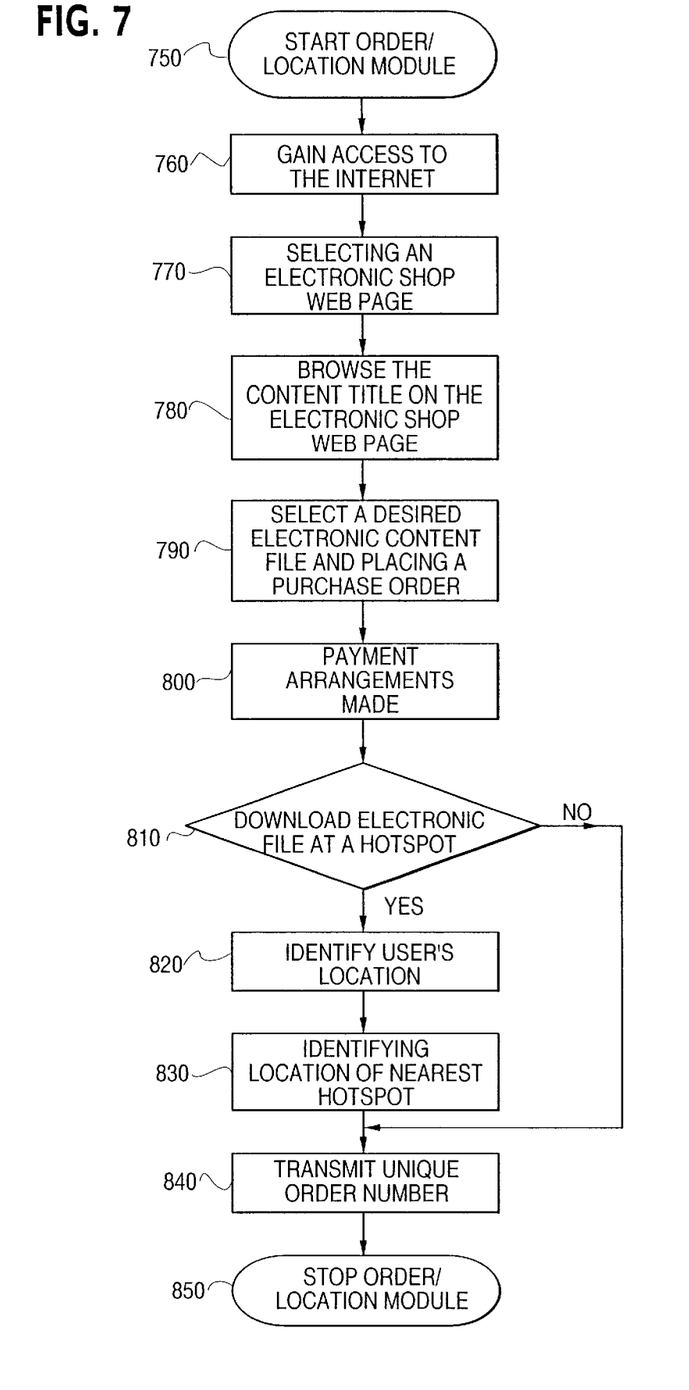
FIG. 7 is a flowchart of an order/location module, shown in FIG. 3, used by the environment present invention.

FIG. 7 is a flowchart of an order/location module 290, shown in FIG. 3, used by the embodiments of the present invention. The order/location module 290 includes operations 750 through 850 shown in FIG. 7. The order/location module 290 is started in operations 750 and immediately proceeds to operations 760. In operation 760, the mobile of station 10 gains access to the Internet 150. Thereafter, in operation 770, user 20 selects an electronic shop server 40 web page. Once access to the electronic shop server 40 web page is achieved, the user 20 may browse content titles on the web page in operation 780. Thereafter, in operation 790 the user 20 selects a desired digital product and purchases it. In operation 800, payment arrangements are made with electronic shop server 40. Such payment arrangements may include immediate payment via a credit card or charging the price of the digital product to the user's 20 cellular phone account. Further, payment arrangements may include payment only upon receipt of the digital product. Once payment arrangements have been accomplished, processing proceeds to operation 810 where it determined whether the user 20 desires to have the digital product downloaded at a hotspot network 50. If the user 20 desires to download the digital product in a hotspot 50 location then processing proceeds to operation 820. In operation 820, the user's starting location is determined. This may be the user's 20 current location or some other designated location. Thereafter, in operation 830, the nearest hotspot network 50 locations are transmitted to the user based on designated starting location. Whether the user selects to download the digital product at a hotspot network 50 location or via cellular transmission, the user 20 then receives a unique order number in operation 840. Thereafter, in operation 850 processing of the order/location module 290 terminates.

Referring to FIGS. 4 through 7, once the content or digital product is downloaded into the mobile station 10 it may be transferred from the mobile station 10 to another computer 70 which may be, but not limited to, a personal computer, laptop computer, and palm computer. This may be accomplished via a cable or other short range communications mechanism. Therefore, any processor based system may be the ultimate destination of the content or digital product in addition to the mobile station 10. Using the mobile device having a short range transceiver 210, large digital products may be downloaded and then transferred to the processor based system.

While we have shown and described only a few examples herein, it is understood that numerous changes and modifications as known to those skilled in the art could be made to the present invention. For example, in the foregoing description of the embodiments of the present invention, the primary source of the digital product has been the content provider 100. However, the content provider 100 may, in some instances, also support and operate the hotspot network 50 locations. Further, the hotspot network 50 location and the electronic shop server 40 may be either conduits between the content provider 100 and user 20 or both the electronic shop server 40 and hotspot network 50 location may contain their own database of digital products thereby not requiring a high-speed link between themselves and the content provider 100. Still further, user 20 may elect to download the digital product using a home base station connected via a modem to the local PSTN, thereby eliminating a cellular phone charges. The transfer rate would of course be limited by the modem speed. However, this may be preferred option if the user 20 is not incurring long distance phone charges while connected to the PSTN. Therefore, we do not wish to be limited to the details shown and described herein, but intend to cover all such changes and modifications as are encompassed by the scope of the appended claims.

I claim:

1. A method of ordering and downloading digital products into a mobile device, said method comprising:

accessing by the mobile device, an electronic shop server through a mobile network and ordering a digital product from the electronic shop server;

providing information through the mobile network to the mobile device identifying at least one hotspot network location where the ordered digital product may be downloaded into the mobile device via a low power radio frequency signal;

detecting, by the mobile device, the presence of a low power radio frequency signal from a signal source within one of the identified hotspot network locations; and downloading the ordered digital product into the mobile device via the detected low power radio frequency signal.

2. The method recited in claim 1, wherein accessing the electronic shop server and ordering the digital product from the electronic shop server comprise:

accessing an Internet service provider using the mobile device;

logging onto a web page of the electronic shop server;

browsing a menu of digital products offered by the electronic shop server; and selecting a digital product for purchase from the menu of digital products offered by the electronic shop server.

3. The method recited in claim 1, further comprising:

receiving an estimated price to download the digital product from the electronic shop server using a network transceiver embedded in the mobile device.

4. The method received in claim 1, wherein providing information to the mobile device identifying at least one hotspot network location includes:

transmitting to the mobile device a list of hotspot network locations where the digital product may be downloaded into the mobile device via the low power radio frequency signal.

5. The method received in claim 1, wherein downloading of the digital product to the mobile device via the low power radio frequency signal includes downloading at least one advertisement to the mobile device for viewing by a user.

6. The method recited in claim 1, further comprising paying for the digital product by charging a price for the digital product to a credit card or a telephone account for the mobile device.

7. The method recited in claim 1, further comprising paying for the digital product by paying the electronic shop server or paying the identified hotspot network location.

8. The method recited in claim 1, further comprising:

receiving through the mobile network a unique order number corresponding to the mobile device, the ordered digital product, and the identified hotspot network location; and transmitting the unique order number to the identified hotspot network location to initiate the downloading.

9. The method recited in claim 1, wherein downloading the digital product comprises:

transmitting by the identified hotspot network location a list of vendors in the identified hotspot network location having the selected digital product for purchase;

selecting one of the vendors; and downloading the digital product from the selected vendor.

10. The method recited in claim 9, wherein transmitting the list of vendors comprises sorting the list by price.

11. The method recited in claim 9, further comprising:

paying the identified hotspot network location for the digital product prior to downloading the digital product.

12. The method recited in claim 9, further comprising:

paying the vendor for the digital product after downloading the digital product.

13. The method recited in claim 9, further comprising showing the list on a display on the mobile device.

14. A computer program executable by a computer and embedded on a computer readable medium for ordering and downloading digital products into a mobile device, the mobile device including a short range transceiver for receiving and transmitting low power radio frequency signals, a network transceiver for receiving and transmitting cellular telephone signals, a processor connected to the short range transceiver and the network transceiver, a display connected to the processor, and a memory connected to the processor, said computer program comprising:

an electronic shop server code segment to generate a web page and transmit through a mobile network a list of digital products for sale and a list of hotspot network location from which the digital products may be downloaded encoded In a low power radio frequency signal, wherein the digital products may be purchased through the electronic shop server code segment and downloaded to a user via a hotspot network code segment;

a hotspot network code segment responsive to receipt of a low power radio frequency signal from a signal source within a hotspot network location for downloading a digital product from the list of digital products; and a mobile device code segment for receiving the downloaded digital product and storing the received digital product in a memory of a mobile device.

15. The computer program recited in claim 14, wherein the electronic shop server code segment further comprises:

a order entry module code segment to accept an order from the mobile device code segment and to transmit a list of locations where the digital product may be downloaded to the mobile device code segment.

16. The computer program recited in claim 14, wherein the electronic shop server code segment further comprises:

a order/location module code segment to accept through the mobile network an order from the mobile device code segment and to transmit through the mobile network a location where the digital product may be downloaded to the mobile device code segment, wherein the location transmitted is closest to a starting location for the mobile device code segment.

17. The computer program recited in claim 14, wherein the hotspot network code segment further comprises:

a hotspot order entry module code segment to accept orders for the digital product from a mobile device code segment over the low power radio frequency and to transmit a list of vendors where the digital product may be downloaded.

18. The computer program recited in claim 17, wherein the hotspot network code segment further comprises:
a hotspot download module code segment to download the digital product to the mobile device code segment, wherein the digital product is purchased either through the electronic shop server code segment or through the hotspot network code segment.

19. A mobile terminal for ordering and downloading a digital product, said mobile terminal comprising:
a processor;
a network transceiver connected to the processor for accessing through a mobile network an electronic shop server to order a digital product, and for receiving information through the mobile network identifying at least one hotspot network location where the ordered digital product may be downloaded via a low power radio frequency link; and
a short range transceiver connected to the processor for detecting a signal indicating the presence of a low power radio frequency link from a signal source within one of the at least one identified hotspot network locations, and for downloading the ordered digital product to said processor via the detected low power radio frequency link at the one of the at least one identified hotspot network locations.

20. The mobile terminal recited in claim 19, further comprising:
a memory connected to the processor for storing the downloaded digital product.

21. The mobile terminal recited in claim 19, further comprising:
a display connected to said processor for displaying the downloaded digital product.

22. The mobile terminal recited in claim 19, wherein said short range transceiver is further for receiving a unique order number corresponding to the mobile terminal, the ordered digital product, and the one of the at least one Identified hotspot network locations; and for transmitting the unique order number to the one of the at least one identified hotspot network locations to initiate downloading of the ordered digital product.

23. A machine readable medium having stored thereon at least one sequence of instructions that, when executed, cause a mobile device to:
access an electronic shop server through a mobile network and order a digital product from the electronic shop server;
respond to information from the mobile network identifying at least one hotspot network location where the ordered digital product may be downloaded into the mobile device via a low power radio frequency link upon detecting of the presence of a low power radio frequency link generated by one of the at least one identified hotspot network locations; and
download the ordered digital product into the mobile device via the detected low power radio frequency link.

24. The machine readable medium recited in claim 23, wherein the instructions cause the mobile device to access the electronic shop server and order the digital product from the electronic shop server by:
accessing an Internet service provider;
logging onto a web page of the electronic shop server;
browsing a menu of digital products offered by the electronic shop server; and
selecting a digital product for purchase from the menu of digital products offered by the electronic shop server.

25. The machine readable medium recited in claim 23, wherein the instructions, when executed, further cause the mobile device to pay for the digital product by charging a price for the digital product to a credit card or telephone account for the mobile device.

26. The machine readable medium recited in claim 23, wherein the instructions, when executed, further cause the mobile device to pay the hotspot network location for the ordered digital product prior to downloading the digital product.

27. The machine readable medium recited in claim 23, wherein the instructions, when executed, further cause the mobile device to pay the vendor for the ordered digital product after downloading the ordered digital product.

28. A method of ordering and downloading digital products into a mobile device having a network transceiver for receiving and transmitting cellular telephone signals and a short range transceiver for receiving and transmitting low power radio frequency signals, said method comprising:
accessing an internet service provider using the mobile device;
logging Into a web page of an electronic shop server;
browsing a menu of digital products offered by the electronic shop server;
selecting a digital product for purchase from the menu of digital products from the electronic shop server;
identifying a hotspot network location where the identified digital product may be downloaded into the mobile device using the short range transceiver;
detecting, by the mobile device, a low power radio frequency signal generated by the hotspot network location;
receiving an estimated cost to download the identified digital product from the electronic shop server using the network transceiver; and
downloading the digital product Into the mobile device via the hotspot network location, using the low power radio frequency signal.

29. The method recited in claim 28, wherein:
identifying the hotspot network location comprises transmitting to the mobile device a list of hotspot network locations from which the digital product may be downloaded into the mobile device using the short range transceiver; and
detecting the low power radio frequency signal comprises detecting by the mobile device the presence of a low power radio frequency signal generated by one of the listed hot spot network locations.

30. The method recited in claim 28, wherein downloading of the digital product to the mobile device via the detected low power radio frequency signal includes downloading at least one advertisement to the mobile device for viewing by a user.

31. The method recited in claim 28, further comprising paying for the digital product by charging a price for the digital product to a credit card or a telephone account for the mobile device.

32. The method recited in claim 28, further comprising paying for the digital product by paying the electronic shop server or paying the hotspot network location.

33. A system for ordering and downloading digital products into a mobile device, comprising:

a hotspot network for transmitting a low power radio frequency signal having a digital product encoded in the low power radio frequency signal;

the mobile device having a short range transceiver for receiving the digital product encoded in the low power radio frequency signal, a network transceiver for receiving and transmitting cellular telephone signals, a processor connected to the short range transceiver, the network transceiver, a display, and a memory for storing the digital product; and an electronic shop server to generate a web page and transmit a list of digital products for sale and a list of hotspot network locations where the digital products may be downloaded encoded in the low power radio frequency signal, wherein the digital products may be purchased at the electronic shop server and either downloaded to a user over the Internet through a public switched telephone network or a cellular telephone network or may be downloaded via the hotspot network location.

* * * * *